3,230,253
PROCESS FOR REMOVING ELEMENTAL CHLORINE FROM CRUDE PHOSGENE WITH A PHENOL
Ludwig Bottenbruch, Krefeld-Bockum, Hermann Schnell, Krefeld-Urdingen, and Karl-Heinz Rullmann, Krefeld, Germany, assignors to Farbenfabriken Bayer Aktiengesellschaft, Leverkusen, Germany, a corporation of Germany
No Drawing. Filed Nov. 28, 1962, Ser. No. 240,721
Claims priority, application Germany, Nov. 30, 1961,
F 35,446
9 Claims. (Cl. 260—544)

This invention relates generally to phosgene and more specifically to a novel and improved process for the production of phosgene.

Phosgene is the diacid chloride of the unstable carbonic acid and is sometimes called carbonyl chloride. It has been used quite extensively in the production of various plastic materials such as, for example, polycarbonates, polyurethanes and the like. Various methods have been known for the production of phosgene such as, for example, the preparation described in "Organic Chemistry" by Fieser and Fieser, 3rd edition, 1956. Probably the most commercially used process involves the combination of carbon monoxide or carbon dioxide and chlorine in the presence of a catalyst. The phosgene produced in this manner usually contains free chlorine impurities due to the fact that the process involved is an equilibrium reaction. The presence of this chlorine impurity in the phosgene, would if allowed to remain as such, impair subsequent phosgene reactions and/or would degrade the quality of the final products produced thereby.

This above noted chlorine contamination problem has been recognized and various methods have been used in an attempt to remedy this difficulty. One known method of removing the free and the elemental chlorine from the crude phosgene is to contact the crude phosgene with a composition containing mercury or amalgams (Cathala, J. chim. phys., 24, 663 et seq./1927) or with antimony (A. F. O. Germann, J. phys. Chem., 28, 884/1924). This process has not found a great deal of commercial success because it requires a substantially long residence time of the phosgene with the material being used to absorb the free and/or the elemental chlorine. The purification of the phosgene and removal of this free chlorine has been accomplished by processes which involve fractional distillation. These processes also have recognized shortcomings since only the purification of small amounts of phosgene can be affected.

It is, therefore, an object of this invention to provide a process for removing free and/or elemental chlorine from a crude phosgene composition, devoid of the foregoing disadvantages. Another object of this invention is to provide an economical and simplified method for recovery of phosgene from a crude phosgene product. A still further object of this invention is to provide a process for the removal of elemental chlorine from a crude phosgene mix whereby the process may be conveniently affected on a large commercial scale. Another object of this invention is to provide a commercially feasible method for the preparation of phosgene, adapted for use with presently available equipment on a commercial scale.

Generally speaking, the foregoing objects and others are accomplished in accordance with this invention by providing a process for the production of a substantially chlorine contamination-free phosgene by contacting the crude phosgene material with an hydroxy aryl compound.

The amount of the hydroxy aryl compound required for the purification of the phosgene material, of course, depends on the free chlorine content of the phosgene. Generally, however, from between about 0.1% and 20% based on weight of the phosgene-chlorine mixture (crude phosgene) is used in the process of this invention. It is understood, however, that the amount of the hydroxyl aryl compound may be varied to any amount depending on the chlorine present.

The treating of the chlorine-containing phosgene may be carried out within a wide temperature range, for instance, from the freezing point of the phosgene to up to about 100 to 120° C. In general, however, it is preferred to use a temperature and the corresponding pressure at which the phosgene is fluid. Therefore, temperatures below about 40° C. are especially usual. In many cases it is advantageous to treat the phosgene with the hydroxy aryl compound at the boiling temperature of the phosgene under atmospheric pressure, that is 8.6° C. to 7.2° C.

It is true that phosgene may react with hydroxy aryl compounds, particularly at elevated temperatures, but such reactions take place only in the presence of catalysts. In the absence of such catalysts the hydroxy aryl compounds are not affected.

The hydroxy aryl compound used in the present invention may be dissolved or suspended in a crude phosgene material and will at the temperature above required react quickly and quantitatively with any free chlorine present. This reaction will take place at low temperature, for example, at the boiling temperature of the phosgene (6.8° C. to 7.2° C.) whereby the hydroxy aryl compound reacts with the free chlorine to form a chlorinated-hydroxy aryl compound at this temperature. There is substantially no reaction of the hydroxy aryl compound with the phosgene present in the crude phosgene mix. Thus, the removal of the elemental chlorine from phosgene is easily accomplished according to this invention by the treatment of the chlorine-containing phosgene with a hydroxy aryl compound.

If the hydroxy aryl compound is such that it does not have a detrimental effect on the further use or reactions of the phosgene, the reaction mixture containing the hydroxy aryl compound and the phosgene may be directly used in some limited instances. The chlorine absorbing material or the hydroxy aryl compound used in the present invention may be any monohydric, dihydric, trihydric, polyhydric, mononuclear, binuclear, polynuclear hydroxy compound, so far as it has at least one hydrogen atom attached to the nucleus which may be substituted by chlorine, such as, a phenol. By phenol we mean to include any of the series of aromatic hydroxyl derivatives of which phenol proper is the type, as illustrated by the following examples. Preferred hydroxy compounds are such which may be chlorinated in p- or/and o-position to hydroxyl groups. Typical are monohydric phenols such as phenol, cresol, xylenol, mesitol, thymol; typical dihydric phenols are dihydroxybenzenes, catechol, resorcinol, quinol, orcinol, dihydroxyxylol, mesorcinol, thymoquinol; typical trihydric phenols are pyrogallol and methylpyrogallol and typical polyhydric phenols are tetrahydroxybenzene, pentahydroxybenzene. Any suitable di(monohydroxyaryl) alkane may be used as the hydroxy aryl compound such as, for example, (4,4'-dihydroxy-diphenyl)-methane,
2,2-(4,4'-dihydroxydiphenyl)-propane,
1,1-(4,4'-dihydroxy-diphenyl)-cyclohexane,
1,1-(4,4'-dihydroxy-3,3'-dimethyl-diphenyl)-cyclohexane,
1,1-(2,2'-dihydroxy-4,4'-dimethyl-diphenyl)-butane (boiling point: 185–188° C. under 0.5 mm. mercury gauge),
2,2-(2,2'-dihydroxy-4,4'-di-tert.-butyl-diphenyl)-propane or
1,1-(4,4'-dihydroxy-diphenyl)-1-phenyl ethane, furthermore, methane derivatives which carry besides two hydroxy aryl groups an alkyl residue with at least two carbon atoms and a second alkyl residue with one or more carbon atoms, such as 2,2-(4,4'-dihydroxy-diphenyl)-butane,
2,2-(4,4'-dihydroxy-diphenyl)-pentane (melting point 149–150° C.),
3,3-(4,4'-dihydroxy-diphenyl)-pentane,
2,2-(4,4'-dihydroxy-diphenyl)-hexane,
3,3-(4,4'-dihydroxy-diphenyl)-hexane,
2,2-(4,4'-dihydroxy-diphenyl)-4-methyl-pentane (melting point 151–152° C.),
2,2-(4,4'-dihydroxy-diphenyl)-heptane (boiling point 198–200° C. under 0.3 mm. mercury gauge),
3,3-(4,4'-dihydroxy-diphenyl)-heptane (melting point 148–149° C.) or
2,2-(4,4'-dihydroxy-diphenyl)-tridecane.

Suitable di-(monohydroxy aryl)-alkanes, the two aryl residues of which are different are for example, 2,2-(4,4'-dihydroxy-3'-methyl-diphenyl)-propane and
2,2-(4,4'-dihydroxy-3-methyl-3'-isopropyl-diphenyl)-butane.

Suitable di-(monohydroxyaryl)-alkanes, the aryl residues of which carry halogen atoms are, for instance 3,3'-dichloro-4,4'-dihydroxy-diphenyl)-methane and 2,2'-dihydroxy-5,5'-difluoro-diphenyl methane. Suitable di(monohydroxy aryl)alkanes, the alkyl residue of which linking the two benzene rings is substituted by an aryl residue are for instance, (4,4'-dihydroxy-diphenyl)-phenyl methane and 1,1-(4,4'-dihydroxy-diphenyl)-1-phenyl ethane. These compounds can be produced in known manner. Any suitable phenolphthalein nucleus compound may be used as the hydroxy aryl compound such as, 4,5,6,7-tetrachlorophenolphthalein,
4,5,6,7-tetrachloro-3',3''-dimethylphenolphthalein,
4,5,6,7-tetrabromophenolphthalein,
4,5,6,7-tetrachloro-2',3',5',6'-tetraiodophenolphthalein and
4,5,6,7-tetraiodo-3',3''-dinitrophenolphthalein and the like.

The process of this invention includes as the hydroxy aryl compound mono- and poly-functional phenol, naphthols and hydroxy compounds of polynuclear aromatic hydrocarbons, the nuclei of which are not fused, such as, diphenyl and diphenylmethane derivatives. It is preferred to use phenols or other hydroxyl aryl compounds which at the boiling point of phosgene have a low vapour pressure such as, for example, 4,4'-dihydroxy-diphenyl, 2,2-bis-(p-hydroxy-phenyl)-alkanes, resorcinol, phloroglucinol and 2,7-dihydroxy naphthalene.

The following examples further define the specifics of this invention. Parts are by weight unless otherwise specified.

EXAMPLE 1

*Example using 4,4'-dihydroxy diphenyl*

About 18.6 parts 4,4'-dihydroxy diphenyl are placed in a 100 ml. Erlenmeyer flask, externally cooled with ice, and about 100 parts liquid phosgene condensed therein. A fixed amount of chlorine is then added to the phosgene in the following manner:

About 0.90 ml. liquid chlorine (at —78° C.=1.494 parts) are condensed in a graduated measuring tube at —78° C. (cooling with methanol and solid carbon dioxide) and liquid phosgene added thereto for the purpose of dilution. This mixture is completely distilled over into the reaction flask and the mixture so obtained is stirred for about four minutes with the aid of a magnetic stirrer, while cooling with an ice-salt mixture.

The liquid phosgene-chlorine mixture is subsequently distilled off and the vapors passed through a vessel containing about 1.8 liters of a 1% sodium iodide solution, the vessel thereby being maintained at about 25° C. by external cooling with water. By subsequently blowing nitrogen through the reaction flask and the delivery pipe, the last traces of the mixture are passed over into the absorption vessel. The resulting sodium iodide solution is then made up to 2000 ml. with distilled water. About 50 ml. amounts were then titrated with N/10 sodium thiosulphate solution until the iodine color has disappeared. There are thereby found about 0.0144 part chlorine remaining which is equal to about 0.96% of the amount originally introduced.

A blank determination is carried out in the same manner but without the addition of phenol; the procedure is carried out as described above. There is introduced about 100 ml. liquid phosgene, about 0.90 ml. liquid chlorine (at—78° C.=1.494 parts). By titration of about 50 ml. of the sodium iodide solution made up to about 2000 ml. with N/10 sodium thiosulphate, there is found about 1.475 parts chlorine (free) remaining which is equal to about 98.6% of the amount originally introduced.

EXAMPLE 2

*Example using phloroglucinol*

The procedure of Example 1 is followed except in this example, there are introduced into the 100 ml. flask about 12.61 parts phloroglucinol, about 100 parts liquid phosgene and about 0.95 ml. liquid chlorine (at —78° C.=1.577 parts) as in the manner of the procedure of Example 1. Upon titration with N/10 sodium thiosulphate, there is found about 0.0217 part chlorine (free) equal to 1.37% of the amount originally introduced. The temperature maintained in this process is —5 to 0° C.

EXAMPLE 3

*Example using resorcinol*

The procedure of Example 1 is followed except in this example there is introduced about 11.01 parts resorcinol, about 100 parts liquid phosgene and about 0.85 ml. liquid chlorine (at —78° C.=1.412 parts) as in the procedure of Example 1. At the termination of this example, the sodium iodide solution contained no free iodine, i.e. there is no longer any free chlorine present. The temperature maintained in this process is —5° to 0° C.

EXAMPLE 4

*Example using 2,7-dihydroxy-naphthalene*

The procedure of Example 1 is followed, however, in this example there is introduced about 16.02 parts 2,7-dihydroxy-naphthalene, about 100 parts liquid phosgene and about 0.90 ml. liquid chlorine (at —78° C.=1.494 parts). At the termination of the run, the sodium iodide solution contained no free iodine, i.e. there is no longer any free chlorine present. The temperature maintained in this process is —5 to 0° C.

EXAMPLE 5

*Example using 4-hydroxy-diphenyl-methane*

The procedure of Example 1 is followed, however, there is introduced about 18.42 parts 4-hydroxy-diphenylmethane, about 100 parts liquid phosgene and about 0.90 ml. liquid chlorine (at —78° C.=1.494 parts). Upon titration with N/10 sodium thiosulphate, there is found about 0.0216 part chlorine (free) remaining in the mix equal to 1.44% of the amount originally introduced. The temperature maintained in this process is —5 to 0° C.

The following two examples illustrate that the dihydroxy aryl compound does not react with the phosgene, but reacts only with the chlorine impurities.

EXAMPLE 6

About 25 ml. of liquid phosgene is placed in a 100 ml. flask which is cooled with a reflux cooler. About 0.5 part of resorcinol is added to the flask and mixed with the phosgene while the flask is heated to the temperature of about the boiling point of phosgene (6.8° C. to 7.2° C.). There is no reaction when the resorcinol is added and the resorcinol remains insoluble in the solution. Chlorine gas is slowly added to the flask maintained constantly at the same temperature (6.8° C. to 7.2° C.). The resorcinol reacts immediately with the chlorine and the solution at first is colorless but then after about 10 minutes is a yellowish-green. The chlorine flow is turned off and the mixture maintained at the boiling point of phosgene for another 15 minutes and then the phosgene is distilled off. The residue remaining consists of 0.8 part of colorless crystals having a melting point of 65 to 72° C. The residue is recrystallized from water and results in a fine needle type crystal. These crystals had a chlorine content of about 48.5 to 48.8% (calculated for trichloro resorcinol—49.8%). At this temperature the hydroxyl aryl compound (resorcinol) reacted only with the free chlorine and not with the phosgene.

EXAMPLE 7

The procedure as described in Example 6 is followed except that 0.5 part of 4,4-dihydroxy diphenyl is used rather than the resorcinol in Example 6. The chlorine is added until the solution turns yellowish-green as a result of the presence of the free chlorine contamination. The mixture is kept at the boiling point of phosgene for 15 minutes and the phosgene is distilled off. The residue remaining contains 44.5% chlorine (calculated for tetrachloro-4,4'-dihydroxy diphenyl—43.8% chlorine). It should be noted in both Examples 6 and 7 that a chlorine catalyst is not used and thus is shown not to be required in the process of this invention. At the critical temperature specified above (−10° C. to 40° C.) the hydroxy aryl compound reacts only with the free chlorine in the crude phosgene mix.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of substantially elemental chlorine-free phosgene which comprises contacting a crude phosgene mix containing elemental chlorine with a phenol having at least one hydrogen atom attached to the phenolic nucleus at a temperature above the freezing point of phosgene.

2. The process of claim 1 wherein the crude phosgene is contacted with said phenol at a temperature between the freezing point of phosgene and about 120° C.

3. The process of claim 1 wherein the crude phosgene is contacted with said phenol at a temperature below about 40° C.

4. The process of claim 1 wherein the crude phosgene is contacted with said phenol at a temperature of between about −10° C. to about 40° C.

5. The process of claim 1, wherein said phenol is a bis-(p-hydroxy-phenol)-alkane wherein said alkane contains from 1 to 13 carbon atoms.

6. The process of claim 1 wherein said phenol is 4,4'-dihydroxy diphenyl.

7. The process of claim 1 wherein said phenol is resorcinol.

8. The process of claim 1 wherein said phenol is phloroglucinol.

9. The process of claim 1 wherein said phenol is 2,7-dihydroxy naphthalene.

References Cited by the Examiner
UNITED STATES PATENTS 2,211,467  8/1940  Kimball et al. _____ 260—544 X

OTHER REFERENCES

Dryson: "Chem. Reviews," vol. 4, pp. 109–165, page 151 relied on.

LORRAINE A. WEINBERGER, *Primary Examiner.*

LEON ZITVER, *Examiner.*